United States Patent
Johnson

[11] Patent Number: 6,088,403
[45] Date of Patent: Jul. 11, 2000

[54] SIGNAL EXTRACTION METHOD AND APPARATUS

[76] Inventor: Neldon P. Johnson, 512 S. 860 East, American Fork, Utah 84003

[21] Appl. No.: 09/443,905

[22] Filed: Nov. 19, 1999

Related U.S. Application Data

[63] Continuation-in-part of application No. 09/268,707, Mar. 16, 1999.

[51] Int. Cl.[7] .............................. H03D 1/00; H04L 27/06
[52] U.S. Cl. ............................................. 375/340; 375/360
[58] Field of Search ...................................... 375/260, 340, 375/316, 360, 350, 259, 268, 320, 285, 346; 329/347, 349, 363

[56] References Cited

U.S. PATENT DOCUMENTS

| | | | |
|---|---|---|---|
| 3,805,191 | 4/1974 | Kawai et al. | 332/9 |
| 3,890,620 | 6/1975 | Toman et al. | 343/108 |
| 4,001,728 | 1/1977 | Schneider | 332/1 |
| 4,103,238 | 7/1978 | Deming et al. | 325/141 |
| 4,347,616 | 8/1982 | Murakami | 375/20 |
| 4,387,455 | 6/1983 | Schwartz | 370/11 |
| 4,480,485 | 11/1984 | Bradshaw et al. | 73/861.28 |
| 4,584,692 | 4/1986 | Yazuka et al. | 375/38 |
| 4,766,589 | 8/1988 | Fisher | 370/32 |
| 5,220,557 | 6/1993 | Kelley | 370/50 |
| 5,274,672 | 12/1993 | Weiss | 375/47 |
| 5,367,536 | 11/1994 | Tsujimoto | 375/42 |
| 5,369,669 | 11/1994 | Tombal et al. | 375/25 |
| 5,390,185 | 2/1995 | Hooijmans et al. | 370/98 |
| 5,517,528 | 5/1996 | Johnson | 375/259 |
| 5,519,735 | 5/1996 | Rice et al. | 375/347 |
| 5,640,422 | 6/1997 | Johnson | 375/259 |
| 5,689,529 | 11/1997 | Johnson | 375/259 |

Primary Examiner—Tesfaldet Bocure
Attorney, Agent, or Firm—J. David Nelson

[57] ABSTRACT

A method and apparatus for separating multiple frequency information signals. This invention provides a method and apparatus for separating a communications signal, which is comprised of multiple component information waves of distinct frequencies, into its component waves for demodulation. The extraction of the component information waves is accomplished by determining the mid-cycle zero crossing points of the component information waves by reference to a reference wave, determining the amplitude of the combined wave at these zero crossing points and generating amplitude equations for each of these zero crossing points. These amplitude equations are solved to determine the amplitude coefficients of the component information waves, thereby extracting the transmitted information.

40 Claims, 6 Drawing Sheets

Legend
1  Combined Information Wave
2  Reference Wave
3  First Component Information Wave
4  Second Component Information Wave
5  Third Component Information Wave
6  First Component Amplitude
7  Second Component Amplitude
8  Third Component Amplitude
9  Reference Wave Amplitude
39  First Component Positive Wave Segment
40  First Component Negative Wave Segment
41  Second Component Positive Wave Segment
42  Second Component Negative Wave Segment
43  Third Component Positive Wave Segment
44  Third Component Negative Wave Segment Legend
1  Combined Information Wave
10  Combined Wave Analog to Digital Convertor
11  Digitized Combined Wave
12  Combined Wave Storage
13  Wave Subtractor
14  Reference Wave Filter
15  Extracted Reference Wave
16  Reference Wave Analog to Digital Convertor
17  Digitized Reference Wave
18  Digitized Residual Combined Wave
19  Reference Wave Zero Crossing Determinator
20  Component Wave Zero Crossing Determinator
21  Reference Wave Zero Crossing Data
22  Component Wave Zero Crossing Data
23  Component Zero Crossing Amplitude Determinator
24  Component Zero Crossing Amplitude Data
25  Amplitude Equation Solver
26  Component Information Wave Amplitude Coefficients
27  Split Combined Information Wave

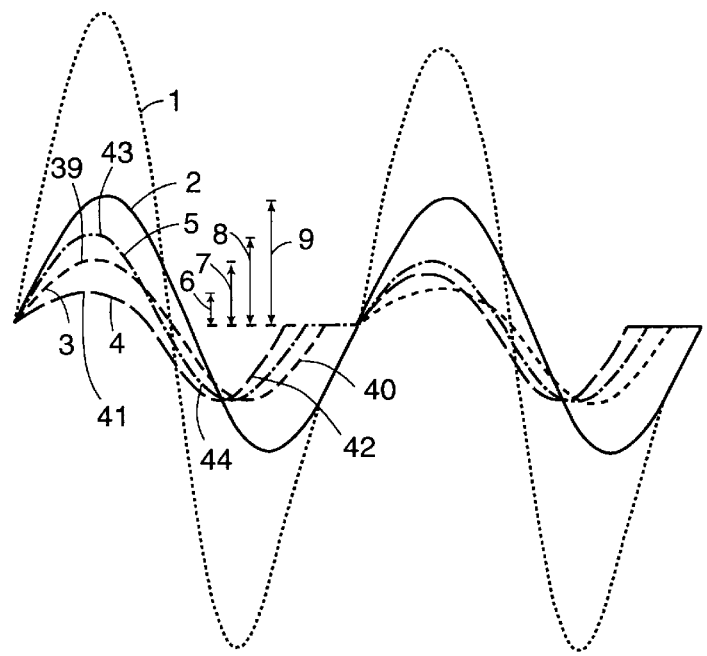

FIG. 1

Legend

| | | | |
|---|---|---|---|
| 1 | Combined Information Wave | 39 | First Component Positive Wave Segment |
| 2 | Reference Wave | 40 | First Component Negative Wave Segment |
| 3 | First Component Information Wave | 41 | Second Component Positive Wave Segment |
| 4 | Second Component Information Wave | 42 | Second Component Negative Wave Segment |
| 5 | Third Component Information Wave | 43 | Third Component Positive Wave Segment |
| 6 | First Component Amplitude | 44 | Third Component Negative Wave Segment |
| 7 | Second Component Amplitude | | |
| 8 | Third Component Amplitude | | |
| 9 | Reference Wave Amplitude | | |

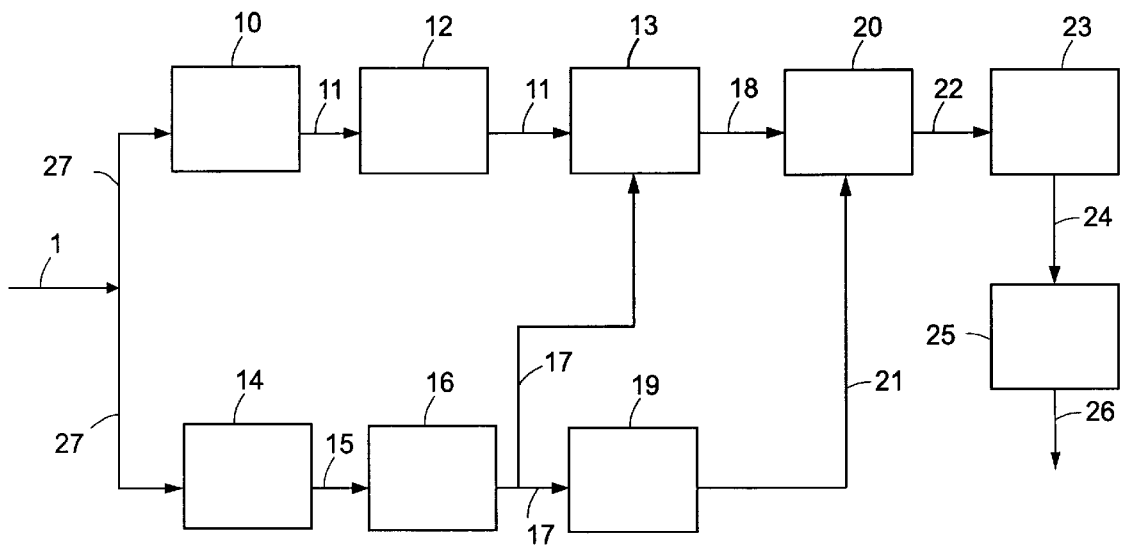

FIG. 2

Legend

| | | | |
|---|---|---|---|
| 1 | Combined Information Wave | 20 | Component Wave Zero Crossing Determinator |
| 10 | Combined Wave Analog to Digital Convertor | 21 | Reference Wave Zero Crossing Data |
| 11 | Digitized Combined Wave | 22 | Component Wave Zero Crossing Data |
| 12 | Combined Wave Storage | 23 | Component Zero Crossing Amplitude Determinator |
| 13 | Wave Subtractor | | |
| 14 | Reference Wave Filter | 24 | Component Zero Crossing Amplitude Data |
| 15 | Extracted Reference Wave | | |
| 16 | Reference Wave Analog to Digital Convertor | 25 | Amplitude Equation Solver |
| 17 | Digitized Reference Wave | 26 | Component Information Wave Amplitude Coefficients |
| 18 | Digitized Residual Combined Wave | 27 | Split Combined Information Wave |
| 19 | Reference Wave Zero Crossing Determinator | | |

Legend

2 Reference Wave
28 Reference Wave Mid-Cycle Zero Crossing Point
29 Half Way Line
30 Reference Wave Positive Apex
31 Reference Wave Negative Apex

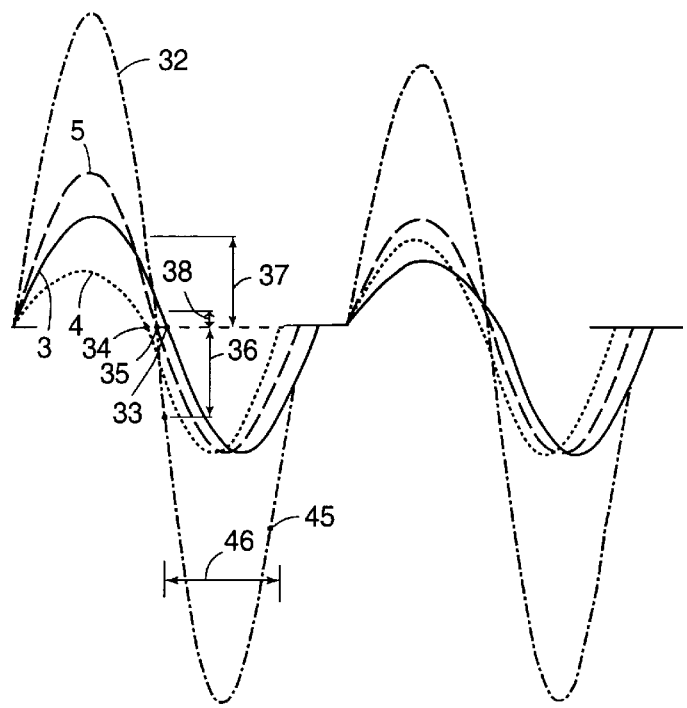

FIG. 4

Legend

| | | | |
|---|---|---|---|
| 3 | First Component Information Wave | 35 | Third Component Zero Crossing |
| 4 | Second Component Information Wave | 36 | First Component Zero Crossing Amplitude |
| 5 | Third Component Information Wave | 37 | Second Component Zero Crossing Amplitude |
| 32 | Residual Combined Information Wave | 38 | Third Component Zero Crossing Amplitude |
| 33 | First Component Zero Crossing | 45 | Calibration Point |
| 34 | Second Component Zero Crossing | 46 | Calibration Zone |

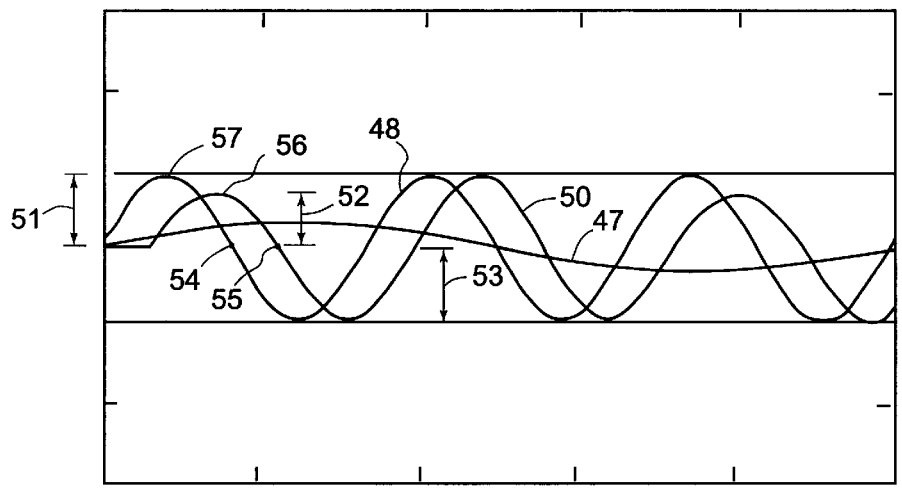

FIG. 5

Legend

47 First Reference Wave
48 Second Reference Wave
50 Component Information Wave
51 Second Reference Wave Amplitude
52 Positive Cycle Component Information Wave Amplitude
53 Negative Cycle Component Information Wave Amplitude
54 Second Reference Wave Zero Crossing
55 Component Information Wave Zero Crossing
56 Component Information Wave Peak
57 Second Reference Wave Peak

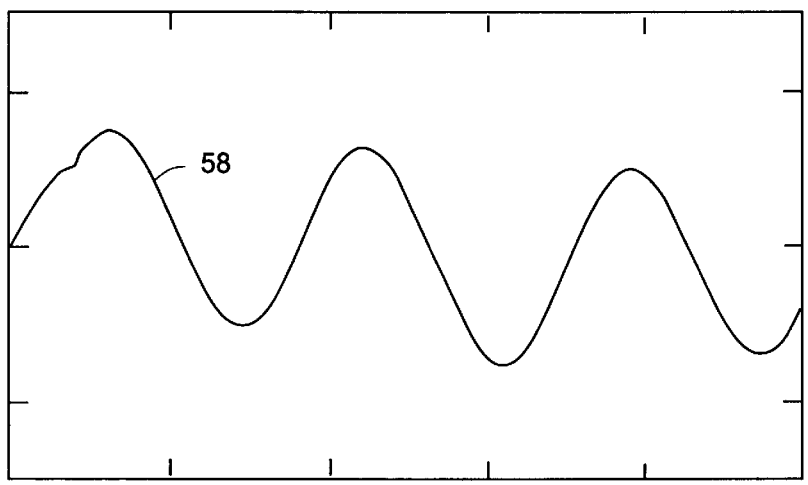

FIG. 6

Legend

58 Combined Information Wave

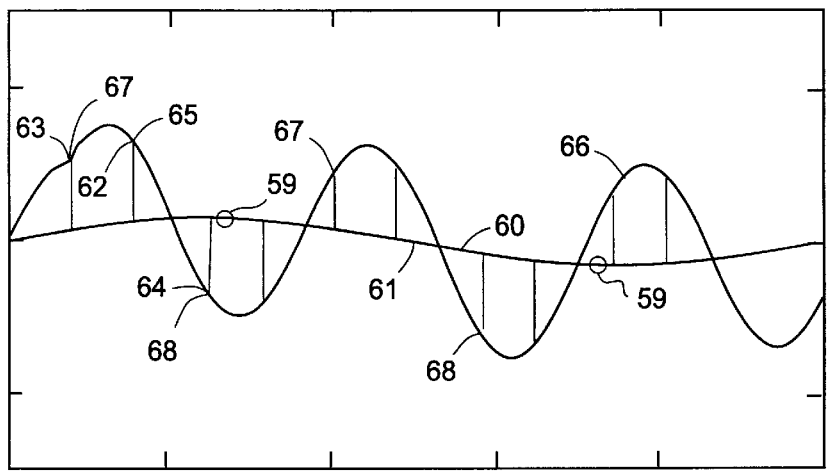

FIG. 7

Legend

59  First Reference Wave Peak
60  Phase Corrected First Reference Wave
61  First Reference Wave Zero Crossing
62  Second Reference Wave Zero Crossing
63  Second Reference Wave Peak
64  Component Information Wave Zero Crossing
65  Component Information Wave Peak
66  Received Combined Information Wave
67  Second Reference Wave Positive Peak
68  Second Reference Wave Negative Peak

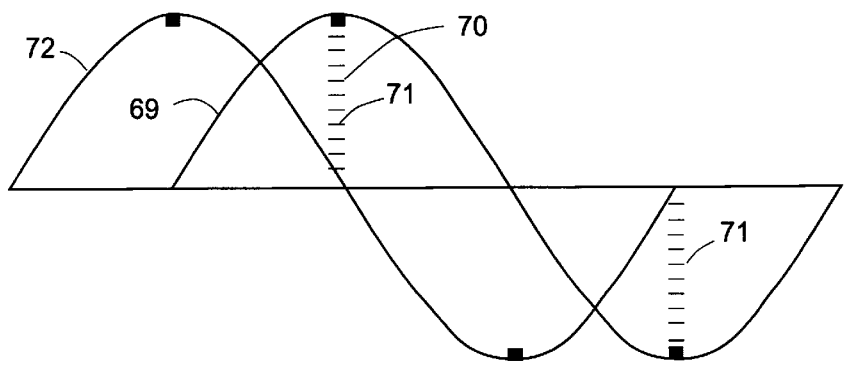

FIG. 8

Legend

69  Component Information Wave
70  Information Bits
71  Component Information Wave Amplitude Levels
72  Reference Wave

SIGNAL EXTRACTION METHOD AND APPARATUS

PRIOR RELATED APPLICATIONS

This application is a continuation in part application for a prior filed and currently pending U.S. patent application Ser. No. 09/268707 filed on Mar. 16, 1999.

FIELD OF THE INVENTION

This invention is the field of filters for electromagnetic signals and in particular the field of filter systems for separating the components of multiple frequency signals.

BACKGROUND OF THE INVENTION

The conventional method for separating out an information signal of a specific frequency from signals of other frequencies, which together with the specific frequency comprise a combined signal, and from noise, is a filter comprised of inductor and capacitor circuits. Such filters interfere with and alter the wave and, therefore, fail to reproduce the wave in the pure form in which it was transmitted. The bandwidth of the retrieved wave is substantially larger than the bandwidth of the wave as transmitted. It should be noted, however, that the increase in the bandwidth is not a function of the propagation of the wave. It is a function of the filtering process.

Another problem with conventional filters is that they require multiple cycles of the input signal in order to ramp up. Until the ramping up is complete, the filtering will be ineffective. This substantially limits the amount of data that can be transmitted by multiple frequency signals and extracted by conventional filters. A filtering method is needed which will allow a single cycle to be filtered and data to be accurately extracted from each cycle.

The inventor herein has had three prior patents issued which disclose methods and apparatuses for digital information transfer. They are U.S. Pat. Nos. 5,517,528, 5,640,422, and 5,689,529 to Johnson, and are hereinafter referred to as the "prior related patents". Also, a prior application, U.S. application Ser. No. 08/879,755, has been filed by the inventor herein which discloses certain methods and apparatuses for filtering electromagnetic signals. The present application discloses an additional method and an additional apparatus for filtering electromagnetic signals.

Continuous combined information waves which are simultaneously generated at multiple frequencies, combined and transmitted as a single information signal are disclosed in the prior related applications and patents. Advanced filter systems which allow the utilization of the capabilities of the inventions disclosed in the prior related applications and patents are also disclosed in the prior related applications and patents. However, a filter method and apparatus is needed which will provide for minimizing the complexity of the signal separation process, minimizing the bandwidth of the extracted multiple frequency components, and enhancing the accuracy of the extracted data.

The limitations of conventional signal extraction methods also impose substantial limitations on digital information storage technology. Current digital technology allows only one bit per cycle to be transferred from a read/write head to a magnetic storage device such as a hard drive, a magnetic disc, or an external magnetic drive. These current storage systems operate using analog functions. In addition, as data is transferred, the spacing between the storage medium and the read/write head changes, distorting or degrading the signal amplitude. When the distance between the head and the storage medium changes, the energy transfer rate is inversely proportional to the square of the distance. Therefore, any deviation of the read/write head changes the amplitude of the waves. For this reason digital recording procedures can measure only amplitude change. No information is derived from actual amplitudes.

One objective of the present invention is to provide an improved and simplified method and apparatus for filtering and separating combined multiple frequency signals.

Another objective of the present invention is to provide for separation of individual frequency components of multiple frequency signals while minimizing interference and minimizing the bandwidth of each of the extracted components, thus further enhancing the accuracy of the data transmitted by each of the extracted wave components.

A still further objective of the present invention is to provide a method and apparatus for separating multiple frequency combined signals while minimizing bandwidth distortion.

A still further objective of the present invention is to provide a method and apparatus for filtering simultaneous multiple frequency signals of distinct frequencies which is simpler, more reliable, and less costly than conventional methods.

A still further objective of the present invention is to provide a filter method and apparatus which will increase the storage capacity of magnetic digital storage devices and will enhance the accuracy of data transfer between a read/write head and a magnetic storage device.

A still further objective of the present invention is to provide an effective filter method and apparatus which is adapted for use with the information transfer receiver apparatuses disclosed in the prior related applications.

SUMMARY OF INVENTION

The present invention provides an improved method and apparatus for filtering and separating a received multiple frequency combined signal into its various frequency components. It may be used in conjunction with the digital information transfer inventions disclosed in the prior related applications and patents.

The method of the present invention comprises a method of extracting information from an electromagnetic signal which is comprised of two or more waves of distinct frequencies. Under certain preferred embodiments the combined information wave is comprised of a reference wave with a known wave form, amplitude, frequency and phase and one or more component information waves with known wave forms and frequencies and a known phase relationship to the reference wave. For certain preferred embodiments, one half cycle of each of the information waves has a known calibration amplitude. For certain embodiments, the frequency of each of the component information waves is distinct from the frequency of each of the other component information waves and the reference wave. For other embodiments the reference wave and one or more of the component information waves are the same frequency but the component information waves are phase shifted from the reference wave. Certain of these embodiments utilize a reference wave and a single component information wave of the same frequency, with the component information wave phase shifted by 90 degrees with respect to the reference wave. This is a simplified version which is more robust in some environments.

For certain preferred embodiments the frequency of the reference wave is sufficiently less or sufficiently greater than the frequencies of the component information waves so that it can be separated from the rest of the combined information wave by a typical narrow bandpass filter. The ratio of the amplitude of each half cycle of each respective component information wave to the amplitude of the reference wave is a function of the digital data being transmitted by that component information wave. This allows the effect of noise on the combined information wave and thus the component information waves to be filtered out.

Alternative embodiments utilize two reference waves, preferably one with a frequency less and one with a frequency greater than the frequencies of the component information waves. For these embodiments each of the reference waves is extracted by a narrow band-pass filter. The information is carried by each component information wave as a ratio of the its amplitude to the amplitude of each of the reference waves. This allows a cross check of the extracted data.

Rather than consisting entirely of an arrangement of narrow band pass filters and other necessary components as in a conventional filter system or consisting of the special filters disclosed in the prior related applications and patents, certain preferred embodiments of the method of the present invention utilize one or more computer circuits which perform a mathematical analysis on the received combined signal.

The first step in extracting the information from the combined information wave as received by the receiving apparatus is to store the combined information wave for processing. The combined information wave is then passed through a narrow bandpass filter with frequency selected to match the frequency of the reference wave, thereby extracting the reference wave from the combined information wave. This reference wave filter will cause a phase shift in the reference wave. This phase shift is constant for a given filter and a specific frequency reference wave and thus the filtered reference wave is phase shifted to compensate for the phase shift imposed by the reference wave filter, thereby restoring the phase relationship between the reference wave and the component information waves Next, the zero crossing points of the reference wave are determined by locating points on the wave which are half way between the positive apex and the negative apex of the wave. Once the zero crossing points of the reference wave have been determined, since the frequencies and the phase relationship of the component information waves with respect to the reference wave are known the zero crossing points of each of the component information waves can be determined.

Amplitude equations are then generated for each of the component information wave zero crossing points. Each of these equations is in the form of the sum of the unknown or known amplitude, depending on which half cycle an information wave is in at the zero crossing point in question, of each non-zero component information wave as multiplied by its known phase factor at that point which together equal the observed amplitude at the component information wave zero crossing point in question. This process results in the generation of linear amplitude equations with the number of equations and number of unknowns being less than or equal to the number of component information waves. Next, these equations are solved for the unknown amplitudes thereby extracting the transmitted digital information corresponding to each component information wave. For certain preferred embodiments, these amplitudes are relative to the amplitude of the reference wave.

The process can be repeated at other non-zero points in the calibration half cycle. For instance, at points where the component information waves are each in their calibration half cycle, the calibration zone, the amplitude and phase factors of each of the component waves is known and thus the amplitude of the combined information wave with the reference wave deducted, the residual wave, and the combined information wave at any such point can be computed. To the extent that the observed amplitude of these combined waves differs from the computed amplitude at any such point, a calibration can be performed.

The receiving apparatus of certain preferred embodiments of the present invention includes a combined wave analog to digital converter to digitize the combined information wave as it is received and a digital storage medium for storing the digitized wave. A narrow bandpass filter extracts the reference wave from the combined information wave and then the reference wave is also digitized by a reference wave digitizer. The reference wave digitizer also readjusts the phase of the reference wave which is phase shifted as it passes through the reference wave filter, thereby restoring the phase relationship between the reference wave and the component information waves. The phase readjusted and digitized reference wave is then passed to a reference zero crossing computer where the zero crossing points are located on the wave at points where the wave is half way between the positive wave apex and the negative wave apex. The residual combined information wave which is the combined information wave with the reference wave extracted passes to the residual wave digitizer and then is stored in the residual wave storage device. The digitized residual wave is then passed along with the reference wave zero crossing point information to the amplitude equation computer which generates and solves the amplitude equations thereby determining the amplitudes of the component information waves. One or more points in the calibration zone may then be selected for calibration.

An embodiment of a transmission apparatus which can be used to generate and transmit the combined information wave for which the present invention was designed to extract information, would include a reference wave generator, a digital to analog generator for converting to analog the digital signals which are to be transmitted by each component information wave, a gain control device for adjusting the amplitude of the combined information wave and a transmitter for transmitting the amplitude adjusted combined information wave. Embodiments of transmission methods and apparatuses for generating and transmitting the combined information waves from which the present invention is designed to extract information are disclosed in the prior related inventions and applications.

A reference wave can be a discontinuous and periodically repeated wave, a discontinuous wave which is repeated with the same frequency as the component information waves, or a continuous wave. In any event, for most preferred embodiments it would have a pre-set amplitude.

For certain preferred embodiments of the present invention, the ratio of the amplitude of a component information wave to the amplitude of the reference wave is determined by the magnitude of the digital information carried by that component information wave. However, the amplitude of the component information wave may merely be a function of the digital data transmitted. The amplitude of the component information waves can be adjusted at the receiver by comparing the amplitude of the reference wave as received to the known amplitude of the reference wave as transmitted.

The filtration method of the present invention does not interfere with the combined wave or the component waves and the information component can be removed with little distortion and with a much narrower bandwidth as compared with conventional filters.

Preferred embodiments of the present invention involve a mathematical analysis and the use of one or more computer circuits. For preferred embodiments, each component information wave has a known wave form and frequency. Also, under preferred embodiments, the relative phase or positioning of each component information wave with regard the reference wave is also known.

Certain preferred embodiments utilize additional steps to enhance the extraction of the component information waves for certain applications. For these embodiments, the amplitude of the combined information wave is adjusted prior to transmission to a selected amplitude so that all cycles of the combined wave have the same pre-set amplitude. Since the amplitudes of the reference and information waves are adjusted proportionally when the combined wave is adjusted, the amplitude adjustment does not affect the accuracy of the information transmitted.

In the same manner the amplitudes of all of the combined waves in a wave stream, can be adjusted so that they are all the same amplitude. This step allows the waves to be filtered at the receiver through conventional filters or the special filters disclosed in the prior related applications and patents. Because all the waves in a particular wave stream are of the same amplitude they can pass through a conventional filter. Also, because each half cycle is the same amplitude the zero crossing of the reference wave can be found by halving the amplitude. Also, a single cycle of the resultant wave can be stored and can be repeatedly sent through a filter. To the filter this will appear as a continuous wave and will pass through, while noise will be filtered out. The waves can then be separated using the methods disclosed.

The step of making all of the combined waves the same amplitude is very useful in certain applications, especially those applications where passing the signal through conventional filters is required. This is the case for telephone line communications. It also has utility in wireless communication where communication signals such as the time slotted multiple frequency signals disclosed in the prior related applications can first be separated from other communication signals channels using regular filter techniques. Then the component information waves can be extracted using the methods disclosed for the present invention. This process will provide a cleaner wave for component wave extraction by the methods disclosed.

A benefit to this type of modulation and these embodiments of the present invention is that whatever affects the combined wave affects the component information waves and reference wave proportionally. Therefore, the effects of noise and interference are minimized.

BRIEF DESCRIPTION OF THE DRAWINGS

FIG. 1 is an illustration of a combined information wave comprised of the reference wave and three component information waves, the positive half cycle of each component information wave carrying information and the negative half cycle of each having a known calibration amplitude.

FIG. 2 is a schematic diagram of a preferred embodiment of a demodulation apparatus of the present invention.

FIG. 4 illustrates a residual combined information wave with component information wave zero crossing point location and amplitude determination.

FIG. 5 illustrates a simplified embodiment utilizing a component information wave and two reference waves, the component information wave having the same frequency as the higher frequency reference wave and being phase shifted with respect to the higher frequency reference wave, and the lower frequency reference wave serving as a sync and calibration wave.

FIG. 6 illustrates a combined information wave comprised of the waves illustrated in FIG. 5.

FIG. 7 illustrates a received combined information wave comprised of the waves shown in FIG. 5, with low frequency reference wave filtered and superimposed for high frequency reference wave and component information wave peak determination.

FIG. 8 illustrates data carried by the component information wave shown in FIG. 5.

DETAILED DESCRIPTION OF PREFERRED EMBODIMENTS

Figure 3:
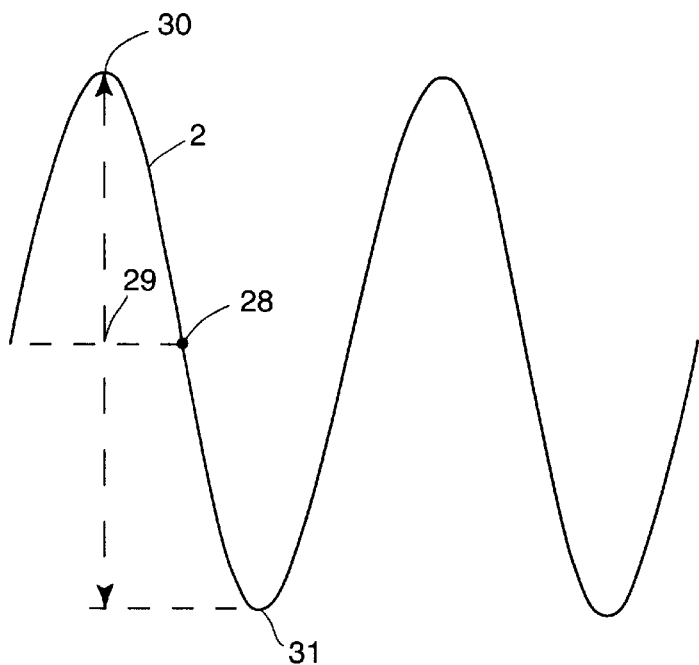
FIG. 3 illustrates an extracted reference wave with zero crossing point determination.

Referring first to FIG. 1, this figure illustrates a combined information wave 1 which is comprised of a reference wave 2 and three component information waves, a first component information wave 3, a second component information wave 4, and a third component information wave 5. The first component information wave has a first component positive wave segment 39 and a first component negative wave segment 40. The second component information wave has a second component positive wave segment 41 and a second component negative wave segment 42. Likewise, the third component information wave has a third component positive wave segment 43 and a third component negative wave segment 44. The combined information wave can be comprised of a reference wave and any number of component information waves, subject only to the processing capability of the receiving apparatus. For the embodiment illustrated in FIG. 1, the amplitude of the positive half cycle of each component information wave is a function of the digital information being transmitted by that component information wave. The negative half cycle of each component information wave has a known calibration amplitude. Under preferred embodiments the ratio of the amplitudes of one half cycle of each of the component information waves, which for the waves shown in FIG. 1 is the first component positive segment amplitude 6, the second component positive segment amplitude 7, and the third component positive segment amplitude 8, to the amplitude of the reference wave 9 is used to transmit the information. This allows amplitude adjustment of the combined information wave to facilitate transmission or to facilitate filtering or further processing of the signal at receiver. This also preserves the integrity of the data transmitted regardless of noise, attenuation or other interference with the signal, whether the signal was transmitted by wireless signal or other common media such as telephone lines or coaxial cable.

Alternative embodiments utilize two reference waves, preferably one with a frequency less and one with a frequency greater than the frequencies of the component information waves. For these embodiments each of the reference waves is extracted by a narrow band-pass filter. The information is carried by each component information wave as a ratio of the its amplitude to the amplitude of each of the reference waves. This allows a cross check of the extracted digital information.

The process of extracting the digital information carried by each component information wave begins, under certain preferred embodiments by splitting the combined information wave, and passing the split combined information wave 27 through a combined wave analog to digital converter 10, as shown in FIG. 2, thereby producing a digitized combined wave 11 and storing the wave for further processing in the combined wave storage 12.

The split combined information wave is also passed through a narrow band pass filter, the reference wave filter 14, thereby extracting the reference wave from the combined information wave. The extracted reference wave 15 is then directed through a reference wave analog to digital converter 16, thereby producing a digitized reference wave 17. The phase of the reference wave is also readjusted by the analog to digital converter to compensate for the phase shift imposed upon the reference wave by the reference wave filter. A digitized residual combined wave 18 is generated by a wave subtractor 13 which subtracts the digitized reference wave from the digitized combined wave.

The next step process is the determination of the mid-cycle zero crossing point 28 of the reference wave as shown in FIG. 3. This is performed by determining the point on the wave which lies on the half way line 29 which is equidistant from the positive apex 30 and the negative apex 31 of the reference wave. This is accomplished by the reference wave zero crossing determinator 19 shown in FIG. 2. Once the reference wave zero crossing point has been determined, the zero crossing points of each of the component information waves as shown in FIG. 4 can be determined by the component wave zero crossing determinator 20 as shown in FIG. 2 through the use of the reference wave zero crossing data 21 and the digitized residual combined wave. Referring to FIG. 4 again, the first component zero crossing point 33 of the first component information wave 3, the second component zero crossing point 34 of the second component information wave 4, and the third component zero crossing point 35 of the third component information wave 5, can be determined by the component wave zero crossing determinator because the phase relationship between each of the component information waves and the reference wave is known. The first component zero crossing amplitude 36, the second component zero crossing amplitude 37, and the third component zero crossing amplitude 38 are determined by the component zero crossing amplitude determinator 23 shown in FIG. 2 from the residual combined information wave 32 shown in FIG. 4 through the use of the component wave zero crossing data 22. The component zero crossing amplitude data 24 is used to generate an amplitude equation for each of the zero crossing points.

For the example illustrated in FIG. 1, which is a combined information wave comprised of a sinusoidal reference wave and sinusoidal first combined component information wave, second component information wave and third component information wave, the waves each have the general form of $a*\sin(\omega t+\phi)$ with a being the amplitude coefficient (maximum amplitude) of the wave, $\omega$ being the frequency, and $\phi$ being the phase displacement. Since the phase relationship between the reference wave and each of the component information waves is known, amplitude equations are generated and solved by the amplitude equation solver 25 from the component zero crossing amplitude data 24 as shown in FIG. 2. The only unknown for each component information wave is the amplitude coefficient for a given cycle. The amplitude equations which are generated for the example illustrated in FIG. 1 and FIG. 4 are as follows:

$$a_1c_1+a_2c_2=A_1.$$

$$a_2c_3+a_3c_4=A_2$$

$$a_1c_5+a_3c_6=A_3$$

For the amplitude equations illustrated above, the only unknowns are the amplitude coefficients of the component information waves, namely $a_1$, $a_2$ and $a_3$. Those three unknown component information amplitude coefficients 26 can be determined from the solution of these three linear equations by the amplitude equation solver 25 as shown in FIG. 2.

One or more additional equations can also be generated for any calibration point 45 in the calibration zone 46 of the combined information wave.

$$b_1k_1+b_2k_2+b_3k_3=B_1.$$

For the calibration point shown, $b_1$, $b_2$, and $b_3$ represent the known maximum amplitude of the negative reference segments of the component information waves respectively, and $k_1$, $k_2$, and $k_3$ represent the known phase factors of the component information waves. The computed amplitude, $B_1$, of the residual combined information wave is compared with the measured amplitude and the comparison is used to calibrate the information extracted from the positive half cycle.

The present invention may be utilized with component information waves which are distributed in the cycle or keyed to the cycle of the reference wave in any selected manner. The component information waves for the embodiment shown in FIG. 1 and 4 are sinusoidal waves. However, the present invention can be utilized with component information waves of any selected wave form.

A simplified embodiment is shown in FIG. 5, utilizing two reference waves, a first reference wave 47 and a second reference wave 48, and one component information wave 50. For this embodiment, the second reference wave and the component information wave have the same frequency, with the component information wave being phase shifted by ninety degrees with respect to the second reference wave. The frequency of the first reference wave is substantially less than frequency of the other waves. Alternative simplified embodiments utilize a first reference wave with a frequency that is substantially greater than the other waves. The frequency difference between the first reference and the other waves allows the ready separation of the first reference wave from the combined information wave at the receiver through the use of a conventional filter or the filter apparatuses and methods disclosed in the prior related patents. The second reference wave has a known, constant amplitude 51. For preferred embodiments, the ratio of a positive cycle component information wave amplitude 52 to the second reference wave amplitude is a function of the data carried by that half cycle of the component information wave. Similarly, the ratio of a negative cycle component information wave amplitude 53 is a function of the data carried by that negative half cycle. The first reference wave is used as a synchronizing wave with the phase relationship of the second reference wave and the component information wave to the first reference wave being known. The first reference wave is used at the receiver to determine the second reference zero crossing 54 and the component information wave zero crossing 55. Because of the ninety degree phase difference between the second reference wave and the component information wave, the component information wave peak 56 coincides with the second reference zero crossing and the second reference wave peak 57 coincides with the component information wave zero crossing.

Referring to FIG. 6, the first reference wave, the second reference wave and the component information wave are combined to form a combined information wave 58. This wave can then be transmitted or can be amplitude adjusted and transmitted. Because the data is carried as a ratio between the amplitude of the component information wave and the second reference wave, the amplitude adjustment does not affect the accuracy of the data.

As the combined information wave is received by a receiver, such as that shown in FIG. 2, the combined information wave is stored and the combined wave is passed through a filter, separating out the first reference wave. Since the first reference wave will be phase shifted as it is filtered, the phase shift must be corrected. However, since the frequency of the first reference wave is known and constant, the phase shift can be readily determined and will be constant for a specific filter. Referring to FIG. 7, once the phase correction is made, the first reference wave peaks 59 of the phase corrected first reference wave 60 are used to find the first reference wave zero crossing 61 which is halfway between the peaks. Since the waveform for this wave is known, once the zero crossing point is determined, this wave can be reproduced in its form as transmitted. The first reference wave peaks or the first reference wave zero crossing can then be used to determine the second reference wave zero crossing 62, the location of the second reference wave peak 63, the component information wave zero crossing 64, and the location of the component information wave peak 65 for each half cycle of the received combined information wave 66. This is possible because of the known phase relationship between the first reference wave and the other waves. The phase corrected first reference wave can then be subtracted from the received combined information wave leaving a residual wave comprised of the second reference wave and the component information wave. Because of the ninety degree phase difference between the second reference wave and the component information wave, the second reference wave peak coincides with the component information wave zero crossing and the component information wave peak coincides with the second reference wave zero crossing. Therefore, the amplitude of the second reference wave peak and the amplitude of the component information wave peak can be extracted directly from the residual wave. This process is merely repeated for each half cycle of the component information waves. The positive peak 67 and the negative peak 68 of successive second reference waves are compared with the known values of this wave as transmitted to determine the effects on this wave of power instabilities, system instabilities and Gaussian noise. The ratio of the amplitude of the positive peak of the received second reference wave to the amplitude of the positive peak of the transmitted second reference wave, a second reference correction factor, is used to adjust the amplitude of the positive peak of the received component information wave to compensate for the effects of power instabilities, system instabilities and Gaussian noise on the positive half cycle of the component information wave. Because the component information wave and the second reference wave are of the same frequency and only ninety degrees out of phase, power instabilities, system instabilities, and Gaussian noise are likely to affect the second reference wave and the component information wave comparably. This process is repeated for the negative half cycle of the second reference wave and the component information wave, as well as successive positive and negative half cycles. The information carried by each half cycle is then extracted as a function of the ratio of the amplitude of the component information wave to the amplitude of the second reference wave.

For some embodiments, the ratio of the amplitude of the first reference wave to the amplitude of the second reference wave is also a pre-selected constant. For those embodiments, a calibration second reference wave amplitude can be computed as a function of the measured amplitude of the phase corrected first reference wave. By comparing this calibration amplitude to the second reference amplitude as determined from the residual wave peak at the component information wave zero crossing, a reference calibration factor can be determined which compensates for instabilities and noise. This reference calibration factor can be used to adjust the amplitude of the component information wave. Again, once the second reference wave amplitude and the component information wave amplitude have been determined, the carried information can be extracted as a function of the ratio of the amplitudes of these two waves for each half cycle. This process is repeated for each successive half cycle of the second reference wave and the component information wave.

FIG. 8 illustrates how much data can be carried by a typical half cycle of a component information wave 69. This figure illustrates how five bits of information 70 can be carried on a half cycle of a component information wave with thirty-two amplitude levels 71. To carry ten bits per half cycle, a total of sixty-four amplitude levels are required. The number of amplitude levels required using a conventional system to carry ten bits of information is one thousand twenty four. This illustrates that the method of the present invention provides for substantially more information to be transmitted within a specific power range. As described above, the information may be carried as a ratio of the amplitude of the component information wave to the amplitude of a reference wave 72.

The following analysis further verifies the enhanced use of power through the method of the present invention in transmitting and receiving data. Even if, according to the premise of Shannon's generally accepted channel capacity theorem, a signal used to deliver information to a system requires all the available power that the system can absorb, it does not follow that all of the power absorbed by the receiving system is used to define information. The present inventor asserts that in actuality only two points of a defined function are used to define the information within the defined period. The power between those defined points is not used to define any information. Therefore the power in the signal between those points is entirely wasted.

To analyze applicant's assertion that the points defining information in a signal addressed by Shannon's channel capacity theorem use very little power, applicant begins with the definition of a unit impulse function. The unit impulse function is defined $$\int_{-\infty}^{\infty} X(t)\delta(t)dt = x(0)$$

where x(t) is continuous at t=0. It is apparent that any signal having unity area and zero width is the limit as some parameter approaches zero is a suitable representation for $\delta(t)$.

Shannon used the Nyquist sampling theorem to prove his channel capacity theorem. Nyquist uses the impulse function to define the equation used to prove the Nyquist sampling theorem. The equation used by Nyquist is $$x_\delta(T) = \sum_{n=-\infty}^{\infty} x(nT_s)\delta(t - nT_s)$$

The Nyquist sampling theorem states: The representation of a signal x(t) by a so-called ideal instantaneous sampled wave-form of the form $$x_\delta(T) = \sum_{n=-\infty}^{\infty} x(nT_s)\delta(t - nT_s)$$

where T is the sampling interval. Two questions to be answered in connection with such sampling are, "What are the restrictions on x(t) and T to allow perfect recovery of x(t) from $x_\delta(t)$?" Both questions are answered by the uniform sampling theorem for lowpass signals, which may be stated as follows:

THEOREM

If a signal x(t) contains no frequency components for frequencies above f=ω hertz, then it is completely described by instantaneous sample values uniformly spaced in time with period T<½ ω. The signal can be exactly reconstructed from the sampled waveform given by $$x_\delta(T) = \sum_{n=-\infty}^{\infty} x(nT_s)\delta(t - nT_s)$$

by passing it through an ideal lowpass filter with bandwidth B, where ω<B<f−ω with f=t(−1). The frequency 2 ω is referred to as the Nyquist frequency.

Nyquist's sampling theorem proves that after passing $x_\delta(t)$ through an ideal low pass filter every point along a function x(t) is defined.

Shannon in his work used the Nyquist sampling theorem's proof to define his channel capacity theorem. Even though the actual two points to be evaluated, in order to retrieve the data, are not the original sampled points, those points are accurately defined by Nyquist equations. Therefor the two points required by Shannon's channel capacity theorem are also defined by the unit impulse function $x_\delta(t)$. Therefore the two points that are defined uses very little power. In fact in the ideal impulse function no power is used to define those points.

Therefore by definition of a unit impulse signal the two points used by Shannon channel capacity theorem requires almost zero power and therefor the actual recovery of the information is recovered at almost zero power points.

If it is true that the Nyquist theorem defines the two points required by Shannon's channel capacity theorem then it is also true that every other point on the function x(t) is also defined to the very same precision.

From this if every other point can be defined by a system of linear equations, then the information can also be recovered by examining those points using the unit impulse function $x_\delta(t)$ at those points.

Example: A set of two equations defined by x(t)=A sin(ωt+θ)+Bsin(ωt+φ) where the highest frequency is less than 4000 Hz, can be completely defined by the Nyquist sampling theorem as long as the sampling frequency is above 8000 Hz.

If the system is power limited to a maximum power of one unit, then the maximum power that the two signals can deliver will be defined as one-half power unit each. Therefore, a system that can allow a signal to be totally recovered at ten bit accuracies at maximum power will allow one thousand twenty four different positions. Two signals with a maximum of one-half unit power each, could deliver five hundred twelve bits each. Five hundred twelve bits compares with nine bits through prior art systems. This is the case with the method of the present invention because the signal levels are totally independent from each other and therefore the capacity is determined by a simple linear addition. The maximum number of bits per second allowed through the method of the present invention using a single information signal would be forty thousand bits per second, which is computed as ten bits times 4000 Hz. By comparison, the two combined signals using the same power would deliver seventy two thousand bits per second, which is computed as 18 bits times 4000 Hz.

Using the same defined system now increase the number of signals to be added together from 2 to 4. Now each signal can define a maximum of 256 different levels. This equates to the number 8 in decimal notation. Now the total system can handle 4 times 8 which equals 32. The capacity is thus thirty two times four thousand hertz, which equals one hundred twenty eight thousand bits per second.

If this procedure is taken to its maximum limits the, total number of signals that can be added together would be five hundred twelve. If each signal carries one bit, the information transfer rate is five hundred twelve times four thousand hertz equals 2,048,000 bits per second.

The Nyquist sampling theorem may be misapplied, as it generally is, to support the argument that a signal sampled at a maximum rate of eight thousand times per second, with an eight bit accuracy; provides information transfer at the rate of sixty four thousand bits per second, and that this equates to the maximum number of bits allowed through the system. However, in actuality, the system will produce the original signal to an accuracy of eleven bits at all points along the signal function. This means that an infinite number of points along the signal function x(t) are defined to within the eleven bit accuracy.

This means that the two points used to define the information used in Shannon's channel capacity equations are defined by the Nyquist equations. The points used to define the points needed to solve the system of linear equations for the method of the present invention are defined using the same Nyquist functions.

Shannon's channel capacity theorem basically describes the error probability due to Gaussian noise on two extreme points per maximum frequency in a band limited channel. If two more points could be used to define information then those two points could also be defined with the same probability as the first two points. Using the same arguments and functions to describe the accuracy that they could be measured, the second two points could be measured to within the same limits.

In a broader interpretation of Shannon's channel capacity theorem, each set of points that can accurately and independently define information, could be delineated as a different channel. This would preserve Shannon's fundamental assessment of the maximum channel capacity.

Shannon, in developing the channel capacity theorem, assumed that the only change made to the original signal was that of Gaussian noise. Following this same assumption, if the only change to the signal is Gaussian noise, then the new channel capacity would be that described above.

For embodiments of the present invention used in conjunction with the inventions disclosed in the prior related applications, the process is repeated for combined information waves in successive cycles of the reference wave. In this way, multiple channels of combined information waves can each be successfully and accurately separated into its component information waves for demodulation.

The speed at which the extraction process can be accomplished for the combined information wave received in each reference wave cycle will be dependent on the embodiment of hardware and software utilized.

Other embodiments of the invention and other variations and modifications of the embodiments described above will be obvious to a person skilled in the art. Therefore, the foregoing is intended to be merely illustrative of the invention and the invention is limited only by the following claims.

What is claimed is:

1. Method for extracting component information waves from a combined information wave, said combined information wave comprising two or more component information waves of known and distinct frequencies and known wave forms and relative phases, one half cycle of each component information wave, an information segment, having its amplitude determined as a function of the information carried and the other half cycle, a calibration segment, having a known calibration amplitude, said method comprising:

a) a step of determining an amplitude of the combined information wave at the mid-cycle zero crossing point of each of the component information waves;
   b) a step of generating amplitude equations, one of the amplitude equations corresponding to each of the mid-cycle zero crossing points, with the sum of the unknown or known amplitude coefficients of each of the non-zero component information waves, as adjusted by the phase factor for the corresponding component information wave, being equal to the measured amplitude of the combined information wave at the mid-cycle zero crossing point;
   c) a step of solving the amplitude equations to determine the amplitude coefficients of each of the component information waves;
   d) a step of generating a calibration amplitude equation for one or more selected points on the combined information wave, at which points each of the component information waves has a known amplitude, and the sum of the products of the known amplitude coefficients of the respective component information waves, as adjusted by the known phase factor for the corresponding component information wave, multiplied by the respective known amplitudes of corresponding component information waves being equal to the amplitude of the combined information wave at the selected points; and
   e) a step of computing the amplitude of the combined information wave through use of the calibration amplitude equations, comparing the computed amplitude with the measured amplitude at each of the calibration points, and calibrating the amplitude coefficients determined above for each of the component information waves.

2. Method as recited in claim 1 wherein the combined information wave further comprises one or more reference waves of known amplitude, frequency and phase, and wherein the component information waves are synchronized by reference to the reference waves, and the method further comprises a step of dividing the combined information wave into a number of divided information waves, the number of divided information waves matching the number of the reference waves, and passing the divided waves through narrow bandwidth filters, one filter being frequency matched to each of the reference waves, thereby extracting each of the reference waves from the combined information wave, a step of determining zero crossing points of each of the reference waves, and a step of determining the mid-cycle zero crossing points of the component information waves by reference to one or more of the reference waves.

3. Method as recited in claim 1 wherein the combined information wave is amplitude adjusted to a selected amplitude.

4. Method as recited in claim 2 wherein the combined information wave is amplitude adjusted to a selected amplitude.

5. Method as recited in claim 2 wherein the ratio of the amplitude of each component information segment to the amplitude of one or more of the reference waves, is a function of the information transmitted by the component information wave.

6. Method as recited in claim 4 wherein the ratio of the amplitude of each component information segment to the amplitude of one or more of the reference waves, is a function of the information transmitted by the component information wave.

7. Method as recited in claim 2 further comprising a step of readjusting the phases of the extracted reference waves to correct for the phase shift imposed by the narrow bandwidth filters, thereby restoring the phase relationship between the extracted reference waves and the component information waves.

8. Method for extracting component information waves from a combined information wave, said combined information wave comprising one or more reference waves and one or more component information waves, the reference waves and each of the component information waves having known wave forms, known and distinct frequencies, and known relative phases, one half cycle of each component information wave, an information segment, having its amplitude determined as a function of the information carried and the other half cycle, a calibration segment, having a known calibration amplitude, the reference waves each having a known amplitude, and the component information waves being synchronized by reference to the reference waves, said method comprising:

a) a step of dividing the combined information wave into a number of divided information waves, the number of divided information waves matching the number of the reference waves, and passing the divided waves through narrow bandwidth filters, one filter being frequency matched to each of the reference waves, thereby extracting each of the reference waves from the combined information wave;
   b) a step of determining one or more zero crossing points of each of the reference waves;
   c) a step of determining mid-cycle zero crossing points of each of the component information waves by reference to one or more of the reference waves;
   d) a step of determining an amplitude of the combined information wave at the mid-cycle zero crossing point of each of the component information waves;
   e) a step of generating amplitude equations, one of the amplitude equations corresponding to each of the mid-cycle zero crossing points of the component information waves with the sum of the unknown or known amplitude coefficients of each of the non-zero component information waves, as adjusted by the phase factor for the corresponding component information wave, being equal to the measured amplitude of the combined information wave at the mid-cycle zero crossing point;

f) a step of solving the amplitude equations to determine the unknown amplitude coefficients of each of the component information waves;

g) a step of generating a calibration amplitude equation for one or more selected points on the combined information wave, at which points each of the component information waves has a known amplitude, and the sum of the products of the known amplitude coefficients of the respective component information waves, as adjusted by the known phase factor for the corresponding component information wave, multiplied by the respective known amplitudes of corresponding component information waves being equal to the amplitude of the combined information wave at the selected points; and h) a step of computing the amplitude of the combined information wave through use of the calibration amplitude equations, comparing the computed amplitude with the measured amplitude at each of the calibration points, and calibrating the amplitude coefficients determined above for each of the component information waves.

9. Method as recited in claim 8 wherein the combined information wave is amplitude adjusted to a selected amplitude.

10. Method as recited in claim 8 wherein the ratio of the amplitude of each component information segment to the amplitude of one or more of the reference waves, is a function of the information transmitted by the component information wave.

11. Method as recited in claim 9 wherein the ratio of the amplitude of each component information segment to the amplitude of one or more of the reference waves, is a function of the information transmitted by the component information wave.

12. Method as recited in claim 8 further comprising a step of readjusting the phase of each of the extracted reference waves to correct for the phase shifts imposed by the narrow bandwidth filters, thereby restoring the phase relationship between the extracted reference waves and the component information waves.

13. Method for digital information transfer comprising:

a) a step of generating one or more reference waves of selected wave forms, amplitudes, frequencies and phases;

b) a step of generating one or more component information waves of a selected wave form, the frequency of each component information wave being distinct from each of the other component information waves and from the reference waves, one half cycle of each component information wave, an information segment, having its amplitude determined as a function of the information carried, and the other half cycle, a calibration segment, having a known calibration amplitude, and the amplitude of successive information segments of each component information wave being a function of successive magnitudes of a corresponding source digital signal;

c) a step of combining the reference waves and the component information waves to form a combined information wave, the phase relationship between the reference waves and the component information waves being selected to provide for synchronization of the component information waves with the reference waves;

d) a step of transmitting the combined information wave;

e) a step of receiving the combined information wave;

f) a step of dividing the combined information wave into a number of divided information waves, the number of divided information waves matching the number of the reference waves, and passing the divided waves through narrow bandwidth filters, one filter being frequency matched to each of the reference waves, thereby extracting each of the reference waves from the combined information wave;

g) a step of determining one or more zero crossing points of each of the reference waves;

h) a step of determining mid-cycle zero crossing points of each of the component information waves by reference to one or more of the reference waves;

i) a step of determining an amplitude of the combined information wave at the mid-cycle zero crossing point of each of the component information waves;

j) a step of generating amplitude equations, one of the amplitude equations corresponding to each of the mid-cycle zero crossing points of the component information waves with the sum of the unknown or known amplitude coefficients of each of the non-zero component information waves, as adjusted by the phase factor for the corresponding component information wave, being equal to the measured amplitude of the combined information wave at the mid-cycle zero crossing point;

k) a step of solving the amplitude equations to determine the unknown amplitude coefficients of each of the component information waves;

l) a step of generating a calibration amplitude equation for one or more selected points on the combined information wave, at which points each of component information waves has a known amplitude, and the sum of the known amplitude coefficients of each of the component information waves, as adjusted by the known phase factor for the corresponding component information wave, being equal to the amplitude of the combined information wave at the selected points; and m) a step of computing the amplitude of the combined information wave through use of the calibration amplitude equations, comparing the computed amplitude with the measured amplitude at each of the calibration points, and calibrating the amplitude coefficients determined above for each of the component information waves.

14. Method as recited in claim 13 wherein the amplitude of the combined information wave is adjusted to a selected amplitude prior to transmission.

15. Method as recited in claim 13 wherein the ratio of the amplitude of each cycle of each component information segment to the amplitude of one or more of the reference wave, is a function of the magnitude of a corresponding source digital signal.

16. Method as recited in claim 14 wherein the ratio of the amplitude of each cycle of each component information segment to the amplitude of one or more of the reference wave, is a function of the magnitude of a corresponding source digital signal.

17. Method as recited in claim 13 further comprising a step of readjusting the phase of each of the extracted reference waves to correct for the phase shift imposed by the narrow bandwidth filters, thereby restoring the phase relationship between the extracted reference waves and the component information waves.

18. Method for extracting a component information wave from a combined information wave, said combined information wave comprising two reference waves, a first reference wave and a second reference wave, and one component information wave, the reference waves and the component information wave having known wave forms and frequencies, the second reference wave and the component information wave having the same frequency and being ninety degrees out of phase, the phase relationship between the first reference wave and the second reference wave and the component information wave being known, each half cycle of each component information wave having the ratio of its amplitude to the amplitude of the second reference wave determined as a function of the information carried, the reference waves each having a known amplitude, and the second reference wave and the component information wave being synchronized by reference to the first reference wave, said method comprising:

a) a step of dividing the combined information wave into a first divided information wave and a second divided information wave and passing the first divided information wave through a narrow bandwidth filter, thereby extracting the first reference wave;

b) a step of determining one or more zero crossing points of the first reference wave;

c) a step of subtracting the first reference wave from the second divided information wave, thereby generating a resultant wave;

d) a step of determining a zero crossing point for the second reference wave and a zero crossing point for the component information wave by reference to a zero crossing point of the first reference wave;

e) a step of determining the amplitude of the second reference wave as the measured amplitude of the resultant wave at the zero crossing point of the component information wave, and determining the amplitude of the component information wave as the measured amplitude of the resultant wave at the zero crossing point of the second reference wave;

f) a step of extracting information carried by the component information wave as a function of the ratio of the amplitude of the component information wave to the amplitude of the second reference wave.

19. Method as recited in claim 18 further comprising a step of correcting the extracted first reference wave for the phase shift imposed by the narrow bandpass filter, thereby more accurately locating the first reference wave zero crossing points.

20. Method as recited in claim 18 wherein the ratio of the amplitude of the first reference wave to the amplitude of the second reference wave is a known value and the extracted amplitude of the second reference wave is adjusted by comparing the ratio of the amplitudes of the first reference wave to the second reference wave as transmitted to the ratio of the amplitude of the first reference wave to the amplitude of the second reference wave as extracted.

21. Apparatus for extracting component information waves from a combined information wave, said combined information wave comprising two or more component information waves of known and distinct frequencies and known wave forms and phases, one half cycle of each component information wave, an information segment, having its amplitude determined as a function of the information carried and the other half cycle, a calibration segment, having a known calibration amplitude, said apparatus comprising:

a) means for determining an amplitude of the combined information wave at the mid-cycle zero crossing point of each of the component information waves;

b) means for generating amplitude equations, one of the amplitude equations corresponding to each of the mid-cycle zero crossing points, with the sum of the unknown or known amplitude coefficients of each of the non-zero component information waves, as adjusted by the phase factor for the corresponding component information wave, being equal to the measured amplitude of the combined information wave at the mid- cycle zero crossing point;

c) means for solving the amplitude equations to determine the amplitude coefficients of each of the component information waves;

d) means for generating a calibration amplitude equation for one or more selected points on the combined information wave, at which points each of component information waves has a known amplitude, and the sum of the known amplitude coefficients of each of the component information waves, as adjusted by the known phase factor for the corresponding component information wave, being equal to the amplitude of the combined information wave at the selected points; and e) means for computing the amplitude of the combined information wave through use of the calibration amplitude equations, comparing the computed amplitude with the measured amplitude at each of the calibration points, and calibrating the amplitude coefficients determined above for each of the component information waves.

22. Apparatus as recited in claim 21 wherein the combined information wave further comprises one or more reference waves of known amplitudes, frequencies and phases, and wherein the component information waves are synchronized by reference to one or more of the reference waves, and the apparatus further comprises means for dividing the combined information wave into a number of divided information waves, the number of divided information waves matching the number of the reference waves, means for passing the divided waves through narrow bandwidth filters, one filter being frequency matched to each of the reference waves, thereby extracting each of the reference waves from the combined information wave, means for determining one or more zero crossing points of each of the reference waves, and means for determining the mid-cycle zero crossing points of the component information waves by reference to one or more of the reference waves.

23. Apparatus as recited in claim 21 wherein the combined information wave is amplitude adjusted to a selected amplitude.

24. Apparatus as recited in claim 22 wherein the combined information wave is amplitude adjusted to a selected amplitude.

25. Apparatus as recited in claim 22 wherein the ratio of the amplitude of each component information segment to the amplitude of one or more of the reference waves, is a function of the information transmitted by the component information wave.

26. Apparatus as recited in claim 24 wherein the ratio of the amplitude of each component information segment to the amplitude of one or more of the reference waves, is a function of the information transmitted by the component information wave.

27. Apparatus as recited in claim 22 further comprising means for readjusting the phase of each of the extracted reference waves to correct for the phase shift imposed by the narrow bandwidth filters, thereby restoring the phase relationship between the extracted reference waves and the component information waves.

28. Apparatus for extracting component information waves from a combined information wave, said combined information wave comprising one or more reference waves and one or more component information waves, the reference waves and each of the component information waves having known wave forms, known and distinct frequencies, and known relative phases, one half cycle of each component information wave, an information segment, having its amplitude determined as a function of the information carried and the other half cycle, a calibration segment, having a known calibration amplitude, each of the reference waves having a known amplitude, and the component information waves being synchronized by reference one or more of the reference waves, said method comprising:

a) means for dividing the combined information wave into a number of divided information waves, the number of divided information waves matching the number of the reference waves, and passing the divided waves through narrow bandwidth filters, one filter being frequency matched to each of the reference waves, thereby extracting each of the reference waves from the combined information wave;

b) means for determining one or more zero crossing points of each of the reference waves;

c) means for determining mid-cycle zero crossing points of each of the component information waves by reference to one or more of the reference waves;

d) means for determining an amplitude of the combined information wave at the mid-cycle zero crossing point of each of the component information waves;

e) means for generating amplitude equations, one of the amplitude equations corresponding to each of the mid-cycle zero crossing points of the component information waves with the sum of the unknown or known amplitude coefficients of each of the non-zero component information waves, as adjusted by the phase factor for the corresponding component information wave, being equal to the measured amplitude of the combined information wave at the mid-cycle zero crossing point;

f) means for solving the amplitude equations to determine the unknown amplitude coefficients of each of the component information waves;

g) means for generating a calibration amplitude equation for one or more selected points on the combined information wave, at which points each of component information waves has a known amplitude, and the sum of the known amplitude coefficients of each of the component information waves, as adjusted by the known phase factor for the corresponding component information wave, being equal to the amplitude of the combined information wave at the selected points; and h) means for computing the amplitude of the combined information wave through use of the calibration amplitude equations, comparing the computed amplitude with the measured amplitude at each of the calibration points, and calibrating the amplitude coefficients determined above for each of the component information waves.

29. Apparatus as recited in claim 28 wherein the combined information wave is amplitude adjusted to a selected amplitude.

30. Apparatus as recited in claim 28 wherein the ratio of the amplitude of each component information segment to the amplitude of one or more of the reference waves, is a function of the information transmitted by the component information wave.

31. Apparatus as recited in claim 29 wherein the ratio of the amplitude of each component information segment to the amplitude of one or more of the reference waves, is a function of the information transmitted by the component information wave.

32. Apparatus as recited in claim 28 further comprising means for readjusting the phase of each of the extracted reference waves to correct for the phase shift imposed by the narrow bandwidth filters, thereby restoring the phase relationship between the extracted reference waves and the component information waves.

33. Apparatus for digital information transfer comprising:

a) means for generating one or more reference waves of a selected wave form, amplitude, frequency and phase;

b) means for generating one or more component information waves of a selected wave form, the frequency of each component information wave being distinct from each of the other component information waves and from the reference waves, one half cycle of each component information wave, an information segment, having its amplitude determined as a function of the information carried, and the other half cycle, a calibration segment, having a known calibration amplitude, and the amplitude of successive information segments of each component information wave being a function of successive magnitudes of a corresponding source digital signal;

c) means for combining the reference waves and the component information waves to form a combined information wave, the phase relationship between the reference waves and the component information waves being selected to provide for synchronization of the component information waves with the reference waves;

d) means for transmitting the combined information wave;

e) means for receiving the combined information wave;

f) means for dividing the combined information wave into a number of divided information waves, the number of divided information waves matching the number of the reference waves, and passing the divided waves through narrow bandwidth filters, one filter being frequency matched to each of the reference waves, thereby extracting each of the reference waves from the combined information wave;

g) means for determining one or more zero crossing points of each of the reference waves;

h) means for determining mid-cycle zero crossing points of each of the component information waves by reference to one or more of the reference waves;

i) means for determining an amplitude of the combined information wave at the mid-cycle zero crossing point of each of the component information waves;

j) means for generating amplitude equations, one of the amplitude equations corresponding to each of the mid-cycle zero crossing points of the component information waves with the sum of the unknown or known amplitude coefficients of each of the non-zero component information waves, as adjusted by the phase factor for the corresponding component information wave, being equal to the measured amplitude of the combined information wave at the mid-cycle zero crossing point;

k) means for solving the amplitude equations to determine the unknown amplitude coefficients of each of the component information waves;

l) means for generating a calibration amplitude equation for one or more selected points on the combined information wave, at which points each of component information waves has a known amplitude, and the sum of the known amplitude coefficients of each of the component information waves, as adjusted by the known phase factor for the corresponding component information wave, being equal to the amplitude of the combined information wave at the selected points; and m) means for computing the amplitude of the combined information wave through use of the calibration amplitude equations, comparing the computed amplitude with the measured amplitude at each of the calibration points, and calibrating the amplitude coefficients determined above for each of the component information waves.

34. Apparatus as recited in claim 33 wherein the amplitude of the combined information wave is adjusted to a selected amplitude prior to transmission.

35. Apparatus as recited in claim 33 wherein the ratio of the amplitude of each cycle of each component information segment to the amplitude of one or more of the reference waves, is a function of the magnitude of a corresponding source digital signal.

36. Apparatus as recited in claim 34 wherein the ratio of the amplitude of each cycle of each component information segment to the amplitude of one or more of the reference waves, is a function of the magnitude of a corresponding source digital signal.

37. Apparatus as recited in claim 33 further comprising means for readjusting the phase of the extracted reference wave to correct for the phase shift imposed by the narrow bandwidth filter, thereby restoring the phase relationship between the extracted reference wave and the component information waves.

38. Apparatus for extracting a component information wave from a combined information wave, said combined information wave comprising two reference waves, a first reference wave and a second reference wave, and one component information wave, the reference waves and the component information wave having known wave forms and frequencies, the second reference wave and the component information wave having the same frequency and being ninety degrees out of phase, the phase relationship between the first reference wave and the second reference wave and the component information wave being known, each half cycle of each component information wave having the ratio of its amplitude to the amplitude of the second reference wave determined as a function of the information carried, the reference waves each having a known amplitude, and the second reference wave and the component information wave being synchronized by reference to the first reference wave, said apparatus comprising:

a) means for dividing the combined information wave into a first divided information wave and a second divided information wave and passing the first divided information wave through a narrow bandwidth filter, thereby extracting the first reference wave;

b) means for determining one or more zero crossing points of the first reference wave;

c) means for subtracting the first reference wave from the second divided information wave, thereby generating a resultant wave;

d) means for determining a zero crossing point for the second reference wave and a zero crossing point for the component information wave by reference to a zero crossing point of the first reference wave;

e) means for determining the amplitude of the second reference wave as the measured amplitude of the resultant wave at the zero crossing point of the component information wave, and determining the amplitude of the component information wave as the measured amplitude of the resultant wave at the zero crossing point of the second reference wave;

f) means for extracting information carried by the component information wave as a function of the ratio of the amplitude of the component information wave to the amplitude of the second reference wave.

39. Apparatus as recited in claim 38 further comprising means for correcting the extracted first reference wave for the phase shift imposed by the narrow bandpass filter, thereby more accurately locating the first reference wave zero crossing points.

40. Apparatus as recited in claim 38 wherein the ratio of the amplitude of the first reference wave to the amplitude of the second reference wave is a known value, further comprising means for adjusting the extracted amplitude of the second reference wave by comparing the ratio of the amplitudes of the first reference wave to the second reference wave as transmitted to the ratio of the amplitude of the first reference wave to the amplitude of the second reference wave as extracted.

* * * * *